Figure 1:
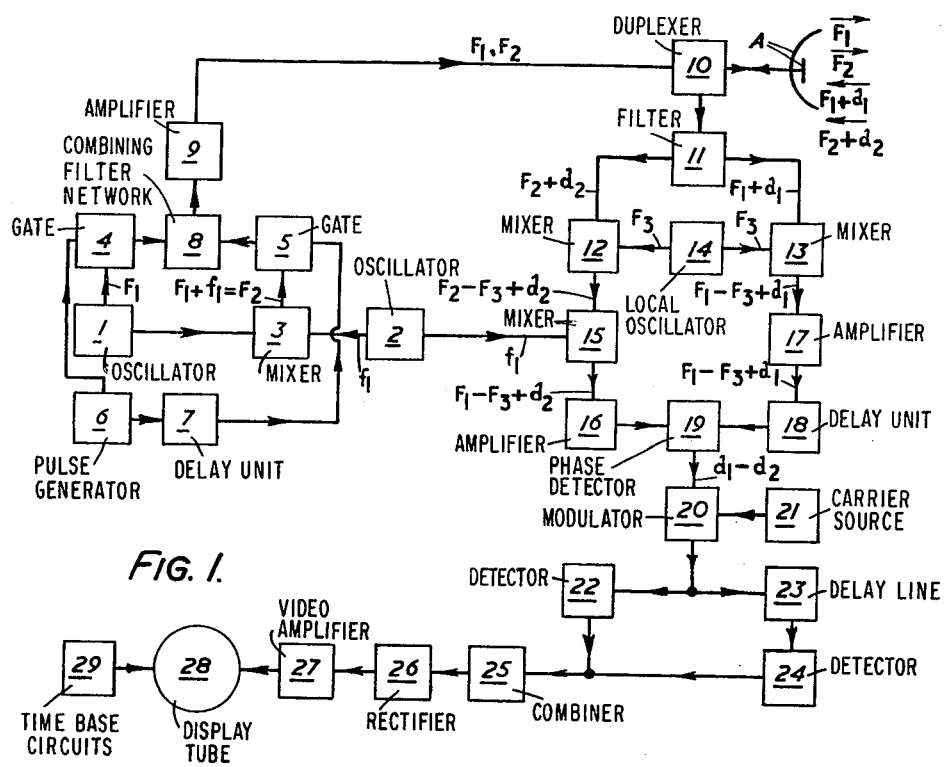

Jan. 12, 1965  E. EASTWOOD ETAL  3,165,738
MOVING TARGET INDICATING RADAR SYSTEM
Filed May 26, 1958  2 Sheets-Sheet 1

INVENTORS:
Eric Eastwood
and
Gordon Nimmo Coop
BY: Baldwin & Wight, ATTORNEYS

Jan. 12, 1965  E. EASTWOOD ETAL  3,165,738
MOVING TARGET INDICATING RADAR SYSTEM
Filed May 26, 1958  2 Sheets-Sheet 2

INVENTORS:
Eric Eastwood
and
Gordon Nimmo Coop
By: Baldwin & Wight, ATTORNEYS

United States Patent Office
3,165,738
Patented Jan. 12, 1965

3,165,738
MOVING TARGET INDICATING RADAR SYSTEM
Eric Eastwood and Gordon Nimmo Coop, Essex, England, assignors to The Marconi Company Limited, London, England, a company of Great Britain
Filed May 26, 1958, Ser. No. 737,972
Claims priority, application Great Britain, June 7, 1957, 18,179/57
5 Claims. (Cl. 343—7.7)

This invention relates to radar systems.

An important object of the invention is to provide improved radar systems which will display moving targets with a minimum of obscuring by fixed targets such as land masses or very slowly more or less random moving targets such as rain clouds or land masses covered with trees which may move in the wind.

It has been proposed in certain so-called moving target indicator (M.T.I.) radar systems to display moving targets to the exclusion of fixed targets by comparing the phase of returning echo signals corresponding to successive transmited pulses and utilising the fact that successive echo pulse signals from fixed targets will be in phase, to eliminate such targets from the display. It has also been proposed in M.T.I. radar systems to display moving targets to the exclusion of slowly moving targets such as rain clouds by intorducing in the receiving portion of the system Doppler correcting frequencies for the purpose of compensating for the velocities of the undesired slowly moving targets and causing signals due to such targets to be cancelled out. However, each of these proposals involves the defect that it introduces a number of target speeds for which the radar system is "blind" and in the case of micro-wave long range radar systems employing a low pulse repetition frequency these "blind speeds" are not very far apart. It may be shown that if the radiated frequency could be greatly reduced the interval between successive "blind speeds" for a given pulse repetition frequency would be greatly increased. It is, however, impracticable and undesirable for obvious reasons to reduce the transmitted frequency to any very great extent. An important object of the invention is to provide improved M.T.I. radar systems which, while using micro-wave transmitted frequencies, will avoid the defect of "blind speeds" which are close together and which, so far as this defect is concerned, will present the characteristics of a radar system having a low radiated frequency.

According to this invention a pulsed radar system comprises means for alternately transmitting pulses of radio frequency waves of different but adjacent frequencies with a predetermined time interval between the transmission of each pulse of one frequency and the transmission of the next pulse of the other frequency, means for receiving the transmitted pulses after reflection from a target, means for separating the received reflected pulses corresponding to transmited pulses of different frequencies into one or other of two channels, delay means in at least one of said channels for providing a time delay difference between said channels substantially equal to said time interval and such that the output from one channel corresponding to reception of a reflected transmitted pulse of one frequency occurs simultaneously with the output from the other channel corresponding to reception of the next reflected transmitted pulse of the other frequency, means for phase comparing the outputs from the two channels, and target display means responsive to the resultant of phase comparison.

The transmitter portion of the radar system may comprise two oscillatory sources of widely different frequencies, a mixer fed from both sources, a path fed with one of the three adjacent frequencies rendered available by such mixing (these three frequencies are the frequency of the higher frequency source and the sum and the difference frequencies of said higher frequency and lower frequency sources), a path fed with another of said three available frequencies, a gating stage in each of said paths, means for alternately opening said gating stages (i.e. rendering them effective to pass signals) one after the other with a predetermined time interval between them and means for transmitting the outputs from both paths. Preferably one path is fed from the higher frequency source and the other from the mixer.

Alternatively the transmiter portion of the radar system may comprise two oscillatory sources of adjacent high frequencies, pulse modulator means for each of said sources, a pulse control source controlling said modulator means through control paths having a difference time delay equal to the required time interval whereby said sources are alternatively operative one after the other with the required time interval between them and means for transmitting the pulsed oscillations from the two sources.

The receiver portion of the radar system may comprise frequency selective means adapted to separate signals derived from received reflected pulses into two channels, one for signals resulting from reflected transmission on one frequency and the other for signals resulting from reflected transmissions on the other frequency, each of said channels having a band width sufficient to accept Doppler frequencies which may be superimposed due to motion of a reflecting target, means for mixing with the derived signals in one channel a frequency equal to the difference between the two transmitted frequencies, means for producing between the two channels a time delay difference equal to the interval between transmission of a pulse of one frequency and the transmission of the next pulse of the other frequency, means for phase comparing the outputs from the two channels and a moving target indicator display arrangement fed from the phase comparison means.

Radar systems in accordance with this invention will display moving targets with fixed targets eliminated. It will, however, be obvious that fixed targets can also be displayed, if required, by combining the outputs of the two channels in the receiving portion of the system and feeding the combined resultant to a display arrangement which will display, accordingly, both fixed and moving targets.

Figure 2:
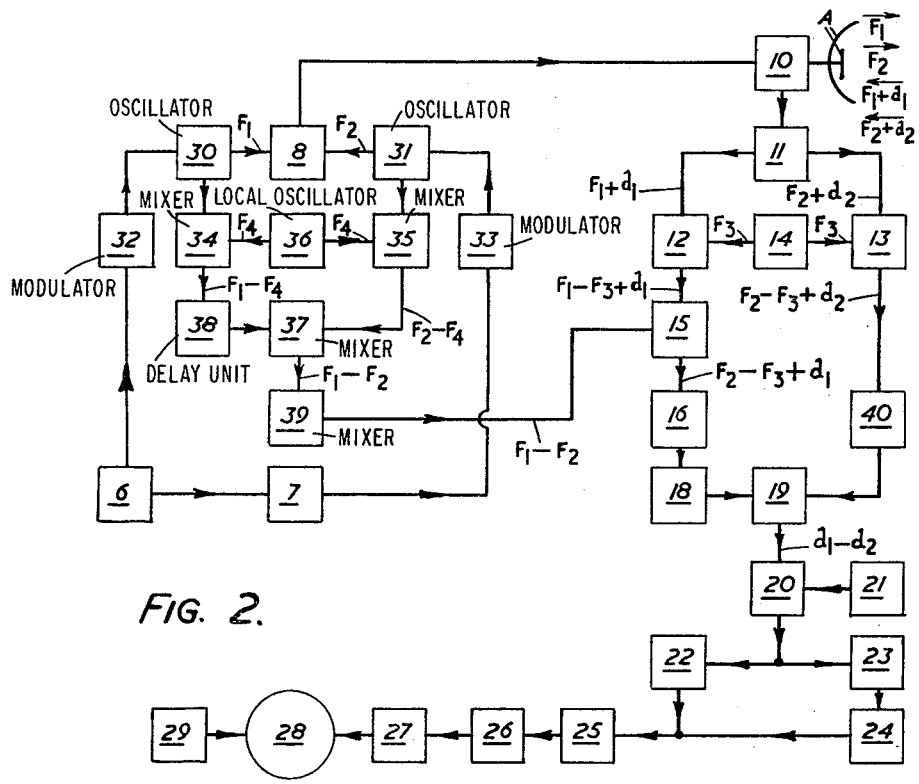

In the drawings, FIGURE 1 diagrammatically shows one embodiment of the invention; and FIGURE 2 diagrammatically shows a further embodiment thereof in which two frequency generating oscillators are modulated, i.e. in effect switched by respective modulators.

Referring first to FIGURE 1, the transmitting portion of the radar system therein represented has two oscillators 1 and 2 of which oscillator 1 generates a frequency $F_1$ in the micro-wave band and oscillator 2 generates a frequency $f_1$ in the metre wave band. Outputs from these two oscillators are fed to a mixer 3 from which the sum frequency $F_1+f_1=F_2$ is selected. The frequencies $F_1$ and $F_2$ are fed into two paths one of which contains a gating stage 4 and the other a gating stage 5. These gating stages are controlled from a pulse generator 6 which produces periodic pulses of predetermined width $t_0$. The control of the gating stage 4 from the pulse generator 6 is direct while that of the stage 5 from the generator 6 is indirect, taking place through a delay unit 7 providing a time delay of predetermined value $t_1$ which is at least as long as the pulse length $t_0$. The gating stages 4 and 5 are "opened," i.e. rendered effective to pass signals, when control pulses are applied thereto and it will be seen that the two stages are opened alternately one after the other with a predetermined time interval between them. The gated outputs from the stages 4 and 5 are combined in a combining filter network 8, amplified by a broad band amplifier 9 and fed to the transmitting receiving aerial A through a suitable duplexer 10.

Received echo pulses from a moving target will be of frequency $F_1+d_1$ and $F_2+d_2$ where $d_1$ and $d_2$ are the Doppler frequency shifts corresponding to the radiated frequencies $F_1$ and $F_2$ respectively. The Doppler shifts may, of course, be either positive or negative in sign depending upon whether the target is approaching or receding. The received echo signals are separted by a filter 11 and fed into one or other of two channels. The filtering is such that each channel will accommodate its own frequency $F_1$ or $F_2$ modified by any Doppler frequency shift likely to be present and which the system is designed to handle. One of the two channels includes a mixer 12, a second mixer 15 and an amplifier 16. The other of the two channels includes a mixer 13, an amplifier 17 and a delay unit 18 providing a time delay equal to $t_1$. The second inputs to the mixers 12 and 13 are taken from a local oscillator 14 which generates a frequency $F_3$. The output from the mixer 12 will accordingly be of frequency $F_2-F_3+d_2$, while that from the mixer 13 will be $F_1-F_3+d_1$. The second input to the mixer 15 is taken from the oscillator 2 of frequency $f_1$. Accordingly the output from the mixer 15 will be of frequency $F_1-F_3+d_2$.

The outputs from the channels are fed to a known phase detector 19 which will accordingly provide output pulses of an amplitude which will fluctuate at a frequency $d_1-d_2$. This output is utilised to operate an M.T.I. cancellation and display arrangement. The particular arrangement shown, and which forms per se no part of this invention, comprises a modulator 20 to which the output from the phase comparator 19 is fed to modulate a carrier frequency of, for example, 10 mc./s. from a carrier source 21. The modulated output from the unit 20 is divided into two paths, one of which comprises detector 22 and the other of which comprises a delay line 23 giving a time delay equal to the reciprocal of the pulse repetition frequency (i.e. the pulse repetition frequency from unit 19) followed by a detecor 24. The outputs from the two detectors 22 and 24 are combined in a combiner 25 which combines the two said outputs in amplitude opposition and this feeds into a rectifier 26 followed by a video amplifier 27 and a PPI or other display tube 28 whose operating time base circuits, which are as well known per se, are schematically represented by the block 29.

It will be seen that this radar system will display moving targets on the display tube 28 with a high degree of immunity from interference by fixed targets, clutter, rain clouds and the like. Furthermore, as regards "blind speeds," the system has the characteristics which would be expected from an M.T.I. radar system employing the same pulse repetition frequency but a radiated frequency of $f_1$, i.e. the difference between the two radiated frequencies $F_1$ and $F_2$.

In the modification shown in FIGURE 2 there are two oscillators 30 and 31 of which one generates the frequency $F_1$ and the other the frequency $F_2$. These oscillators, which may be magnetrons, are "modulated," i.e. in effect switched, by modulators 32 and 33 respectively, each producing pulses of the width $t_0$. Modulator 32 is triggered directly by a periodic pulse generator 6 and the modulator 33 is triggered from said pulse generator through a delay unit 7 providing the time delay $t_1$. The outputs from the oscillators 30 and 31 are combined in a combining circuit 8 and fed through a duplexer 10 to a transmitting aerial A. Thus, as in the arrangements of FIGURE 1, pulses on two adjacent micro-wave frequencies $F_1$ and $F_2$ are transmitted in alternation.

Received echo signals which will be of frequency $F_1+d_1$ and $F_2+d_2$ are separated by the filter network 11 and fed to two channels one of which commences with the mixer 12 and the other of which commences with the mixer 13. Local oscillations of frequency $F_3$ from a local oscillator 14 are applied to both these mixers. The outputs from these mixers 12 and 13 are $F_1-F_3+d_1$ and $F_2-F_3+d_2$. The output from mixer 12 is fed to a further mixer 15 whose second input is equal to the differece between the two transmitted frequencies $F_1$ and $F_2$. This second input is derived by feeding oscillations from the magnetrons 30 and 31 to mixers 34 and 35 respectively with which is associated a local oscillator 36 of frequency $F_4$. The outputs from the mixers 34 and 35, which will be of frequency $F_1-F_4$ and $F_2-F_4$ respectively, are combined in a further mixer 37, the path between the mixers 34 and 37 including a time delay unit 38 providing time delay $t_1$. Accordingly the output from the mixer 37 will be of frequency $F_1-F_2$ and this is used to lock a coherent oscillator 39 operating at the required difference frequency $F_1-F_2$.

The output from the mixer 15 will be $F_2-F_3+d_1$ while that from mixer 13 is, as already stated, $$F_2-F_3+d_2$$

These outputs are amplified in amplifiers 16 and 40 respectively and fed to a phase comparison circuit 19, the path between the amplifier 16 and the unit 19 including a time delay circuit 18 providing time delay $t_1$. The remainder of FIGURE 2 is identical wtih that of FIGURE 1 and requires no further description. Legends applied to "blocks" designated by certain reference numerals in FIGURE 1 will be understood as appertaining to blocks designated by the same reference numerals in FIGURE 2, and therefore are not repeated in FIGURE 2.

We claim:

1. A pulsed radar system comprising an aerial, a transmitter for alternately transmitting from said aerial pulses of radio frequency waves of different but adjacent frequencies with a predetermined time interval between the transmission of each pulse of one frequency and the transmission of the next pulse of the other frequency, a receiver for receiving the transmitted pulses after reflection from a target, said receiver comprising means for separating the received reflected pulses corresponding to transmitted pulses of different frequencies into one or other of two channels, delay means in at least one of said channels for providing a time delay difference between said channels substantially equal to said time interval and such that the output from one channel corresponding to reception of a reflected transmitted pulse of one frequency occurs simultaneously with the output from the other channel corresponding to reception of the next reflected transmitted pulse of the other frequency, a phase detector circuit, means to apply the outputs from the two channels to said phase detector circuit, and target display means responsvie to the resultant of phase comparison by the said phase detector circuit.

2. A system as claimed in claim 1 and wherein the transmitter portion of said system comprises two oscillatory sources of widely different frequencies, a mixer fed from both sources whereby to provide, in combination with said two sources, three resultant available adjacent frequencies, a path fed with one of said adjacent frequencies, a path fed with another of said adjacent frequencies, a gating stage in each of said paths, and means for alternately opening said gating stages one after the other with a predetermined time interval between them.

3. A system as claimed in claim 1 and wherein said transmitter comprises two oscillatory sources of adjacent high frequencies and wherein there are provided pulse modulator means for each of said sources, and a pulse control source controlling said modulator means through control paths having a difference time delay equal to the required time interval.

4. A system as set forth in claim 1 and wherein the said means for separating the received reflected pulses comprises frequency selective means, one of said channels being for signals resulting from reflected transmission on one frequency and the other channel being for signals resulting from reflected transmissions on the other frequency, each of said channels having a band width sufficient to accept Doppler frequencies which may be superimposed due to motion of a reflecting target, and means for miving with the derived signals on one channel a frequency equal to the difference between the two transmitted frequencies, said display being a moving target indicator.

5. A system as claimed in claim 1 and wherein there is also provided means for combining the outputs of the two channels in the receiving portion of the system for feeding of the combined resultant to said target display means.

References Cited by the Examiner
UNITED STATES PATENTS

| | | | |
|---|---|---|---|
| 2,658,195 | 11/53 | McConnell | 343—7.7 |
| 2,676,317 | 4/54 | Purington | 343—18 |
| 2,817,832 | 12/57 | Mathes | 343—13 |

CHESTER L, JUSTUS, *Primary Examiner.*

KATHLEEN CLAFFEY, FREDERICK M. STRADER,
*Examiners.*